United States Patent
Feng

(10) Patent No.: US 10,932,257 B2
(45) Date of Patent: Feb. 23, 2021

(54) DATA TRANSMISSION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Bin Feng, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 15/779,453

(22) PCT Filed: Mar. 18, 2016

(86) PCT No.: PCT/CN2016/076805
§ 371 (c)(1),
(2) Date: May 25, 2018

(87) PCT Pub. No.: WO2017/156788
PCT Pub. Date: Sep. 21, 2017

(65) Prior Publication Data
US 2018/0338307 A1     Nov. 22, 2018

(51) Int. Cl.
*H04L 5/00*     (2006.01)
*H04W 72/04*   (2009.01)
(Continued)

(52) U.S. Cl.
CPC ........... *H04W 72/0446* (2013.01); *H04L 1/00* (2013.01); *H04L 5/003* (2013.01); *H04L 5/0053* (2013.01);
(Continued)

(58) Field of Classification Search
CPC ......... H04L 1/00; H04L 5/003; H04L 5/0053; H04L 5/0055; H04L 5/0064;
(Continued)

(56) References Cited

U.S. PATENT DOCUMENTS 8,537,862 B2 * 9/2013 Blankenship ......... H04L 5/0053
370/252
9,119,197 B2 * 8/2015 Xia ..................... H04W 72/042
(Continued)

FOREIGN PATENT DOCUMENTS

| CN | 102447538 A | 5/2012 |
| CN | 102469609 A | 5/2012 |

(Continued)

OTHER PUBLICATIONS

International Search Report in international application No. PCT/CN2016/076805, dated Dec. 23, 2016.
(Continued)

*Primary Examiner* — Alpus Hsu
(74) *Attorney, Agent, or Firm* — Ladas & Parry, LLP

(57) ABSTRACT

Provided is a data transmission method, comprising: a terminal device receiving a first DCI and a second DCI; said first DCI being used for scheduling said terminal device to receive a first PDSCH which the first TTI is used to transmit on a target carrier, and said second DCI being used for scheduling said terminal device to receive a second PDSCH which the second TTI is used to transmit on a target carrier, the first TTI being smaller than the second TTI and the time resources of the first PDSCH and the second PDSCH at least partially overlapping; determining the priority relationship between the first DCI and the second DCI; according to said priority relationship, receiving the first PDSCH or the second PDSCH on the target carrier. In the method provided by the embodiments of the present invention, it is possible to
(Continued)

dynamically support a plurality of TTIs on the same carrier and perform data transmission, and the terminal device determines the priority of the transmission channels on a carrier; the method satisfies the requirements of a delay and also takes compatibility with the current system into account.

12 Claims, 9 Drawing Sheets

(51) Int. Cl.
*H04W 72/10* (2009.01)
*H04L 1/00* (2006.01)
*H04W 74/08* (2009.01)

(52) U.S. Cl.
CPC .......... *H04L 5/0064* (2013.01); *H04L 5/0094* (2013.01); *H04W 72/042* (2013.01); *H04W 72/10* (2013.01); *H04L 5/0055* (2013.01); *H04W 74/0833* (2013.01)

(58) Field of Classification Search
CPC .............. H04L 5/0094; H04W 72/042; H04W 72/0446; H04W 72/10; H04W 74/0833
See application file for complete search history.

(56) References Cited

U.S. PATENT DOCUMENTS

| | | | |
|---|---|---|---|
| 9,264,963 | B2 | 2/2016 | Yang et al. |
| 9,313,679 | B2 | 4/2016 | Li et al. |
| 9,445,429 | B2* | 9/2016 | Tabet ................ H04W 28/0221 |
| 9,485,060 | B2* | 11/2016 | Nayeb Nazar .......... H04L 1/007 |
| 9,526,112 | B2* | 12/2016 | Tabet ................ H04W 28/0221 |
| 9,674,835 | B2* | 6/2017 | Kim ...................... H04L 1/1854 |
| 9,763,199 | B2* | 9/2017 | Pelletier .............. H04W 52/146 |
| 10,021,677 | B2* | 7/2018 | Mallik ................ H04W 72/042 |
| 10,560,245 | B2* | 2/2020 | Lee ....................... H04L 5/0092 |
| 2010/0255852 | A1 | 10/2010 | Chen |
| 2013/0250893 | A1 | 9/2013 | Li et al. |
| 2014/0307597 | A1* | 10/2014 | Kim ..................... H04B 7/2643 370/280 |
| 2014/0328260 | A1* | 11/2014 | Papasakellariou .......................... H04W 72/1289 370/329 |
| 2015/0055454 | A1 | 2/2015 | Yang |
| 2015/0189574 | A1* | 7/2015 | Ng ........................ H04W 24/08 370/252 |
| 2015/0245323 | A1* | 8/2015 | You ..................... H04W 72/042 370/329 |
| 2016/0174170 | A1 | 6/2016 | Yang et al. |
| 2016/0191222 | A1 | 6/2016 | Li et al. |
| 2017/0164363 | A1 | 6/2017 | Zhang et al. |
| 2017/0290008 | A1* | 10/2017 | Tooher .................. H04L 1/0007 |
| 2018/0110062 | A1* | 4/2018 | Byun ................... H04L 5/0044 |
| 2018/0123769 | A1* | 5/2018 | Pelletier ................. H04L 5/001 |
| 2018/0234998 | A1 | 8/2018 | You et al. |
| 2018/0287742 | A1* | 10/2018 | Feng ..................... H04L 1/1812 |
| 2018/0310324 | A1* | 10/2018 | Ibars Casas .......... H04L 1/1893 |

FOREIGN PATENT DOCUMENTS

| | | |
|---|---|---|
| CN | 104025496 A | 9/2014 |
| CN | 104468030 A | 3/2015 |
| CN | 104769877 A | 7/2015 |
| CN | 104871627 A | 8/2015 |
| EP | 2905914 A1 | 8/2015 |
| EP | 2936911 A1 | 10/2015 |
| EP | 3179654 A1 | 6/2017 |
| EP | 3327975 A1 | 5/2018 |
| WO | 2015026943 A1 | 2/2015 |
| WO | 2016021942 A1 | 2/2016 |

OTHER PUBLICATIONS

The Written Opinion of the International Search Authority in international application No. PCT/CN2016/076805, dated Dec. 23, 2016.
Supplementary European Search Report in the European application No. 16893953.6, dated May 28, 2019.
LG Electronics, Discussion on UE categories and capabilities, 3GPP TSG RAN WG1 Meeting #83 R1-156837, 3GPP, Nov. 7, 2015.
Huawei, HiSilicon, Control signaling enhancements for short TTI 3GPP TSG RAN WG1 Meeting #83, R1-156461, 3GPP, Nov. 7, 2015.
First Office Action of the Japanese application No. 2018-532235, dated Nov. 22, 2019.
Second Office Action of the Chinese application No. 201680064934.9, dated Mar. 9, 2020.
Notice of Allowance of the Japanese application No. 2018-532235, dated Mar. 10, 2020.
Written Opinion of the Singaporean application No. 11201805025X, dated Mar. 23, 2020.
Huawei, HiSilicon; Views on TTI length; 3GPP TSG RAN WG1 Meeting #83 R1-156459; Nov. 15-22, 2015.
First Office Action of the Indian application No. 201817024715, dated Jun. 18, 2020.
Huawei, HiSilicon. "Short TTI for DL transmissions", 3GPP TSG RAN WG1 Meeting #84 R1-160292, published on Feb. 6, 2016, section 3.
Intel Corporation. "Aspects to consider for DL transmission of TTI shortening", 3GPP TSG-RAN WG1 #84 R1-160436, published on Feb. 6, 2016, section 2.3.
ZTE. "Downlink control channels for short TTI", 3GPP TSG RAN WG1 Meeting #84 R1-160983, published on Feb. 6, 2016, section 3.
First Office Action of the Brazilian application No. 1120180138363, dated Jul. 9, 2020.
First Office Action of the Chinese application No. 201680064934.9, dated Nov. 13, 2019, with search report.
First Office Action of the Taiwanese application No. 106109045, dated Sep. 7, 2020.
ZTE: "L1 considerations on latency reduction", 3GPP DRAFT; R1-157151 L1 Considerations on Latency Reduction, 3rd Generation Partnership Project (3GPP), Mobilecompetence Centre; 650, Route Des Lucioles: F-06921 Sophia-Antipolis Cedex; FRANCE vol. RAN WG1, no. Anaheim, USA; 20151115-2015112215 Nov. 2015 (Nov. 15, 2015), XP051003410, Retrieved from the Internet: URL: http://ww.3gpp.org/ftp/Meetings_3GPP-SYNC/RAN/Docs/ [retrieved on Nov. 15, 2015] *Section 2.3 *.
Supplementary European Search Report in the European application No. 20202193.7, dated Dec. 22, 2020.

* cited by examiner

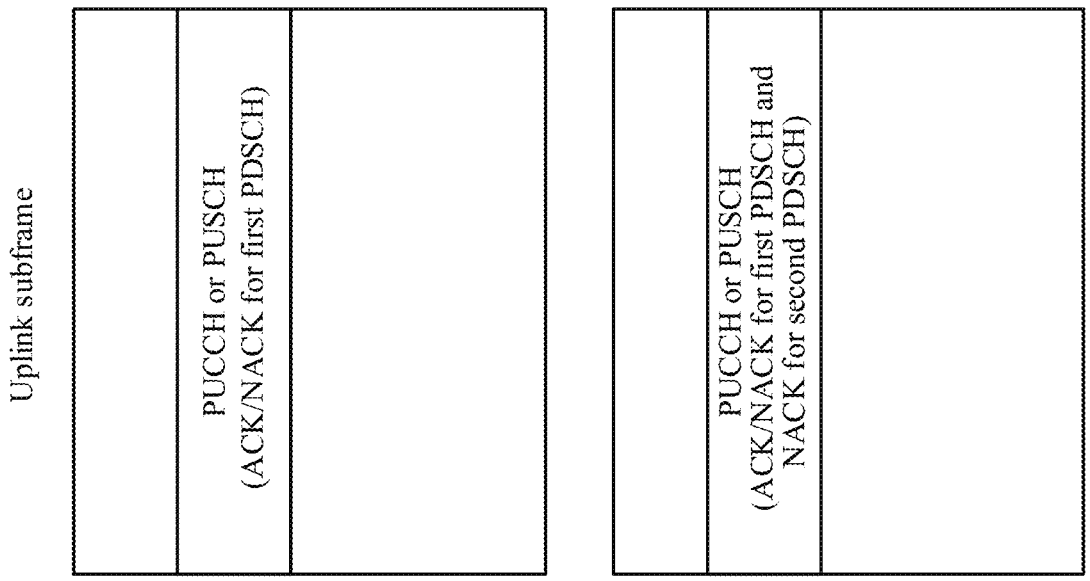
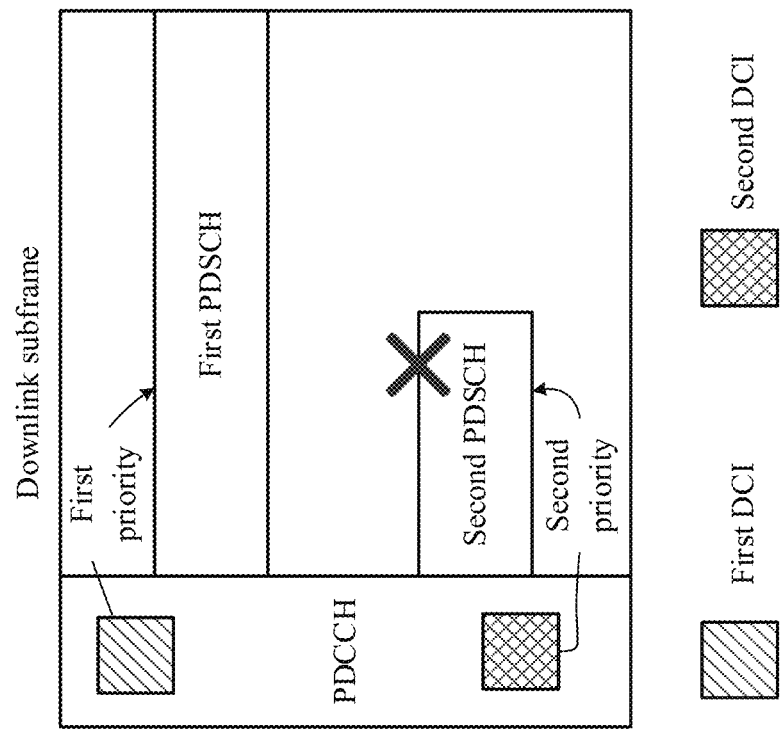
FIG. 6

A terminal device receives a first DCI and a second DCI, wherein the first DCI is configured for scheduling the terminal device to receive a first PDSCH transmitted by using a first TTI on a target carrier, the second DCI is configured for scheduling the terminal device to receive a second PDSCH transmitted by using a second TTI on the target carrier, the first TTI is smaller than the second TTI, and time resources of the first PDSCH and the second PDSCH at least partially overlap ~701

The terminal device determines a priority relationship between the first DCI and the second DCI ~702

The terminal device receives the first PDSCH or the second PDSCH on the target carrier according to the priority relationship ~703

FIG. 7

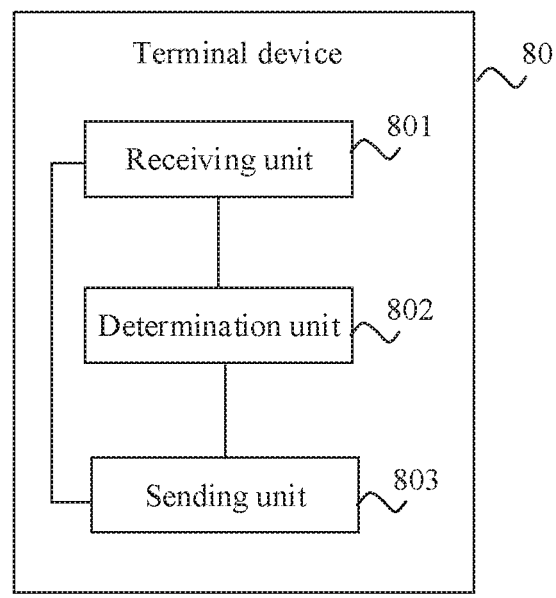

FIG. 8

A network device sends a first DCI and a second DCI, wherein the first DCI is configured for scheduling a terminal device to receive a first PDSCH transmitted by using a first TTI on a target carrier, the second DCI is configured for scheduling the terminal device to receive a second PDSCH transmitted by using a second TTI on the target carrier, the first TTI is smaller than the second TTI, and time resources of the first PDSCH and the second PDSCH at least partially overlap ~1101

The network device receives feedback information from the terminal device ~1102

FIG. 11

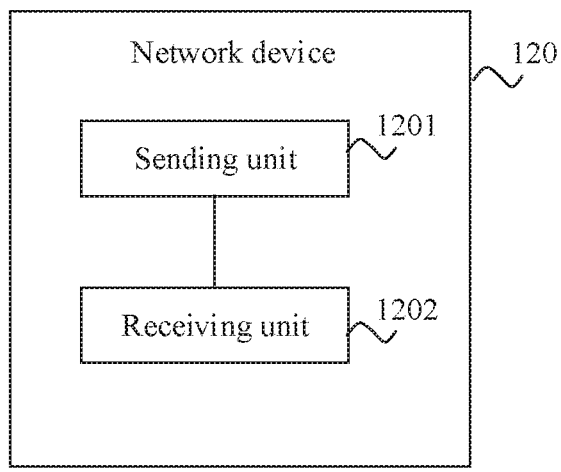

FIG. 12

DATA TRANSMISSION METHOD, TERMINAL DEVICE, AND NETWORK DEVICE

RELATED APPLICATION

This application is an application under 35 U.S.C. 371 of International Application No. PCT/CN2016/076805 filed on 18 Mar. 2016, the entire contents of which are incorporated herein by reference.

TECHNICAL FIELD

Embodiments of the disclosure relate to the field of communications, and more particularly to a data transmission method, a terminal device and a network device.

BACKGROUND

In a future communication technology, along with continuous extension of an air interface technology and applications, reducing a relay becomes one of key performance indicators. For example, an end-to-end delay of real-time remote computing for mobile terminals is required to be smaller than 10 ms, a delay of traffic efficiency and safety is required to be 5 ms, and a duration of a Transmission Time Interval (TTI) of an existing Long Term Evolution (LTE) technology is 1 ms.

Since a delay for data processing and decoding is mainly related to a length of a TTI, one of main technologies for reducing a transmission delay is to shorten the TTI. At present, LTE-Advanced (LTE-A) Release 13 (Rel-13) has determined to start researching use of a shorter TTI for data transmission. A short TTI has the advantage of shortening a transmission delay but also has corresponding cost of high control signaling overhead and low spectral efficiency. For a terminal with services of multiple types, if a unified TTI is determined according to the service with a lowest delay requirement, resources may be wasted. In addition, on a carrier supporting short-TTI transmission, compatibility with an existing LTE system may not be ensured, i.e., there is an incompatibility with a inns TTI.

SUMMARY

The embodiments of the disclosure provide a data transmission method, which may dynamically support multiple TTIs for data transmission on the same carrier, and may not only meet a delay requirement but also achieve the compatibility with an existing system.

A first aspect provides a data transmission method, which may include the following operations.

A terminal device receives first Downlink Control Information (DCI) and second DCI, wherein the first DCI may be configured for scheduling the terminal device to receive a first Physical Downlink Shared Channel (PDSCH) transmitted by using a first TTI on a target carrier, the second DCI may be configured for scheduling the terminal device to receive a second PDSCH transmitted by using a second TTI on the target carrier, the first TTI may be smaller than the second TTI, and time resources of the first PDSCH and the second PDSCH may at least partially overlap.

The terminal device determines a priority relationship between the first DCI and the second DCI.

The terminal device receives the first PDSCH or the second PDSCH on the target carrier according to the priority relationship.

It can be seen that, according to the method provided by the embodiments of the disclosure, data transmission with multiple TTIs may be dynamically supported on the same carrier, and the terminal device may determine a priority of a transmission channel in a subframe. The method may not only meet a delay requirement but also achieve the compatibility with an existing system.

In combination with the first aspect, in a first possible implementation mode, the operation that the priority relationship between the first DCI and the second DCI is determined may include that: the priority relationship between the first DCI and the second DCI is determined according to priorities of Radio Network Temporary Identifiers (RNTIs) of the first DCI and the second DCI.

Wherein, the priority of the RNTI may include a first RNTI priority and a second RNTI priority, wherein the first RNTI priority may include at least one of the following: a System Information RNTI (SI-RNTI), a Paging RNTI (P-RNTI), a Random Access RNTI (RA-RNTI) or a temporary RNTI; and the second RNTI priority may include at least one of the following: a Cell RNTI (C-RNTI) or a Semi-Persistent Scheduling RNTI (SPS-RNTI).

In combination with the first aspect or the first possible implementation mode of the first aspect, in a second possible implementation mode of the first aspect, the operation that the priority relationship between the first DCI and the second DCI is determined includes the following.

When the priority of the RNTI of the first DCI belongs to the first RNTI priority, a priority of the first DCI is determined to be a first priority.

When the priority of the RNTI of the first DCI belongs to the second RNTI priority, the priority of the first DCI is determined to be a second priority.

When the priority of the RNTI of the second DCI belongs to the first RNTI priority, a priority of the second DCI is determined to be the first priority.

When the priority of the RNTI of the second DCI belongs to the second RNTI priority, the priority of the second DCI is determined to be the second priority.

In combination with the first aspect and any one of the above possible implementation modes of the first aspect, in a third possible implementation mode of the first aspect, the operation that the first PDSCH or the second PDSCH is received on the target carrier according to the priority relationship may include the following. When the priority of the first DCI is the first priority and the priority of the second DCI is the second priority, the first PDSCH is received on the target carrier.

When the priority of the first DCI is the second priority and the priority of the second DCI is the first priority, the second PDSCH is received on the target carrier.

In combination with the first aspect or any one of the above possible implementation modes of the first aspect, in a fourth possible implementation mode of the first aspect, the operation that the first or the second PDSCH is received on the target carrier according to the priority relationship may include the following.

When the priority of the first DCI is the first priority and the priority of the second DCI is the first priority, or when the priority of the first DCI is the second priority and the priority of the second DCI is the second priority, the first PDSCH is received on the target carrier.

In combination with the first aspect or any one of the above possible implementation modes of the first aspect, in a fifth possible implementation mode of the first aspect, the method may further include the following.

The terminal device sends Acknowledgement (ACK)/Negative Acknowledgement (NACK) information corresponding to a received PDSCH.

Alternatively, the terminal device sends ACK/NACK information corresponding to a received PDSCH and sends NACK information corresponding to an unreceived PDSCH.

Wherein, when the received PDSCH is the first PDSCH, the unreceived PDSCH may be the second PDSCH, and when the received PDSCH is the second PDSCH, the unreceived PDSCH may be the first PDSCH.

A second aspect provides a terminal device, which may include: a receiving unit, configured to receive a first DCI and a second DCI, wherein the first DCI may be configured for scheduling the terminal device to receive a first PDSCH transmitted by using a first TTI on a target carrier, the second DCI may be configured for scheduling the terminal device to receive a second PDSCH transmitted by using a second TTI on the target carrier, the first TTI may be smaller than the second TTI, and time resources of the first PDSCH and the second PDSCH may at least partially overlap; and a determination unit, configured to determine a priority relationship between the first DCI and second DCI received by the receiving unit, wherein the receiving unit may further be configured to receive the first PDSCH or the second PDSCH on the target carrier according to the priority relationship determined by the determination unit. The terminal device may be configured to execute each process executed by terminal device in the data transmission method of the first aspect and various implementation modes.

A third aspect provides a terminal device, which may include: a receiver, configured to receive a first DCI and a second DCI, wherein the first DCI may be configured for scheduling the terminal device to receive a first PDSCH transmitted by using a first TTI on a target carrier, the second DCI may be configured for scheduling the terminal device to receive a second PDSCH transmitted by using a second TTI on the target carrier, the first TTI may be smaller than the second TTI, and time resources of the first PDSCH and the second PDSCH may at least partially overlap; and a processor, configured to determine a priority relationship between the first DCI and second DCI, wherein the receiver may further be configured to receive the first PDSCH or the second PDSCH on the target carrier according to the priority relationship determined by the processor. The terminal device may be configured to execute each process executed by a terminal device in the data transmission method of the first aspect and various implementation modes.

A fourth aspect provides a data transmission method, which may include that: a network device sends a first DCI and a second DCI, wherein the first DCI may be configured for scheduling a terminal device to receive a first PDSCH transmitted by using a first TTI on a target carrier, the second DCI may be configured for scheduling the terminal device to receive a second PDSCH transmitted by using a second TTI on the target carrier, the first TTI may be smaller than the second TTI, and time resources of the first PDSCH and the second PDSCH may at least partially overlap; and the network device receives feedback information from the terminal device.

Wherein, the feedback information may include ACK/NACK information corresponding to a received PDSCH by the terminal device; or, the feedback information may include: ACK/NACK information corresponding to a received PDSCH by the terminal device and NACK information corresponding to an unreceived PDSCH by the terminal device.

Wherein, when the received PDSCH is the first PDSCH, the unreceived PDSCH may be the second PDSCH, and when the received PDSCH is the second PDSCH, the unreceived PDSCH may be the first PDSCH.

In combination with the fourth aspect, in a possible implementation mode, the method may further include that: the network device determines a priority relationship between the first DCI and the second DCI according to priorities of RNTIs of the first DCI and the second DCI; and the network device determines whether the received PDSCH is the first PDSCH or the second PDSCH according to the priority relationship.

A fifth aspect provides a network device, which may include: a sending unit, configured to send a first DCI and a second DCI, wherein the first DCI may be configured for scheduling a terminal device to receive a first PDSCH transmitted by using a first TTI on a target carrier, the second DCI may be configured for scheduling the terminal device to receive a second PDSCH transmitted by using a second TTI on the target carrier, the first TTI may be smaller than the second TTI, and time resources of the first PDSCH and the second PDSCH may at least partially overlap; and a receiving unit, configured to receive feedback information from the terminal device. The network device may be configured to execute each process executed by a network device in the data transmission method of the fourth aspect and various implementation modes.

A sixth aspect provides a network device, which may include: a sender, configured to send a first DCI and a second DCI, wherein the first DCI may be configured for scheduling a terminal device to receive a first PDSCH transmitted by using a first TTI on a target carrier, the second DCI may be configured for scheduling the terminal device to receive a second PDSCH transmitted by using a second TTI on the target carrier, the first TTI may be smaller than the second TTI, and time resources of the first PDSCH and the second PDSCH may at least partially overlap; and a receiver, configured to receive feedback information from the terminal device. The terminal device may be configured to execute each process executed by a network device in the data transmission method of the fourth aspect and various implementation modes.

A seventh aspect provides a computer chip, which includes: an input interface, an output interface, at least one processor and a memory, and the processor is configured to execute a code in the memory. When the code is executed, the processor may implement each process executed by a terminal device in the data transmission method of the first aspect and various implementation modes.

An eighth aspect provides a computer chip, which includes: an input interface, an output interface, at least one processor and a memory, and the processor is configured to execute a code in the memory. When the code is executed, the processor may implement each process executed by a network device in the data transmission method of the fourth aspect and various implementation modes.

A ninth aspect provides a computer-readable storage medium, which stores a program, and the program enables a terminal device to execute the data transmission method in any one of the first aspect and various implementation modes thereof.

A tenth aspect provides a computer-readable storage medium, which stores a program, and the program enables a network device to execute the data transmission method in any one of the fourth aspect and various implementation modes thereof.

BRIEF DESCRIPTION OF DRAWINGS

In order to describe the technical solutions of the embodiments of the disclosure more clearly, the drawings required to be used in descriptions about the embodiments or a conventional art will be simply introduced below. Obviously, the drawings described below are only some embodiments of the disclosure. Other drawings may further be obtained by those of ordinary skilled in the art according to these drawings without creative work.

FIG. 6 is a schematic diagram of a feedback to a base station according to an embodiment of the disclosure.

FIG. 7 is another schematic flowchart of a data transmission method according to an embodiment of the disclosure.

FIG. 8 is a structure block diagram of a terminal device according to an embodiment of the disclosure.

FIG. 11 is another schematic flowchart of a data transmission method according to an embodiment of the disclosure.

FIG. 12 is a structure block diagram of a network device according to an embodiment of the disclosure.

DETAILED DESCRIPTION

The technical solutions in the embodiments of the disclosure will be clearly and completely described below in combination with the drawings in the embodiments of the disclosure. Obviously, the described embodiments are not all embodiments but part of embodiments of the disclosure. All other embodiments obtained by those of ordinary skilled in the art on the basis of the embodiments in the disclosure without creative work shall fall within the scope of protection of the disclosure.

Figure 1:
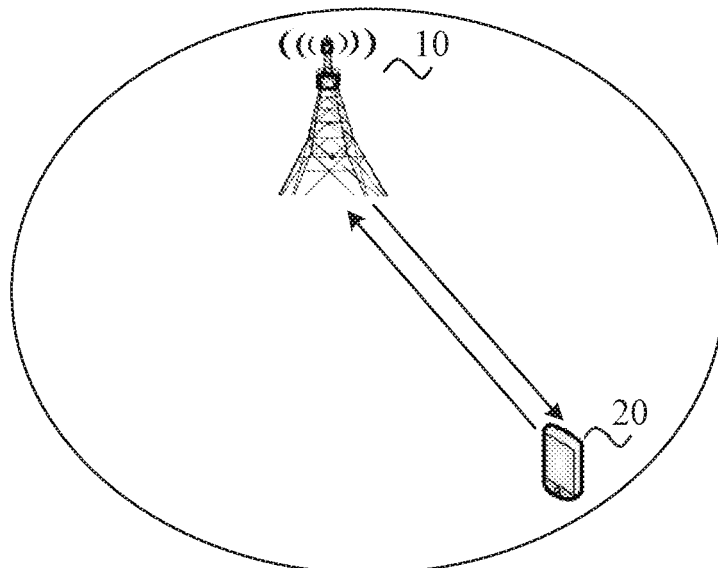
FIG. 1 is a schematic diagram of an application scenario according to an embodiment of the disclosure.

FIG. 1 is a schematic diagram of an application scenario according to the disclosure. In FIG. 1, a terminal device 20 may communicate with a base station 10. Moreover, arrows illustrated in FIG. 1 may represent uplink/downlink transmission performed through a cellular link between the terminal device 20 and the base station 10.

It should be understood that the technical solutions of the embodiments of the disclosure may be applied to various communication systems, for example, a Global System for Mobile Communication (GSM), a Code Division Multiple Access (CDMA) system, a Wideband Code Division Multiple Access (WCDMA) system, a General Packet Radio Service (GPRS), an LTE system, an LTE Frequency Division Duplex (FDD), an LTE Time Division Duplex (TDD), a Universal Mobile Telecommunication System (UMTS) and the like.

It should also be understood that, in the embodiments of the disclosure, the base station may be a Base Transceiver Station (BTS) in the GSM or CDMA, may also be a NodeB in WCDMA, and may further be an Evolutional Node B (eNB or eNodeB) in LTE or a base station device in a future 5th-Generation (5G) network and the like, which will not be limited in the embodiments of the disclosure. The base station may also be called as network equipment, a network side device and the like. It should further be understood that, in the embodiments of the disclosure, the terminal device may communicate with one or more core networks through a Radio Access Network (RAN). The terminal device may be called as an access terminal, User Equipment (UE), a user unit, a user station, a mobile radio station, a mobile station, a remote station, a remote terminal, mobile equipment, a user terminal, a terminal, wireless communication equipment, a user agent or a user device. The terminal device may be a cellular phone, a cordless phone, a Session Initiation Protocol (SIP) phone, a Wireless Local Loop (WLL) station, a Personal Digital Assistant (PDA), handheld equipment with a wireless communication function, a computing device or other processing device connected to a wireless modem, vehicle-mounted equipment, wearable equipment, terminal equipment in the future 5G network and the like.

Figure 2:
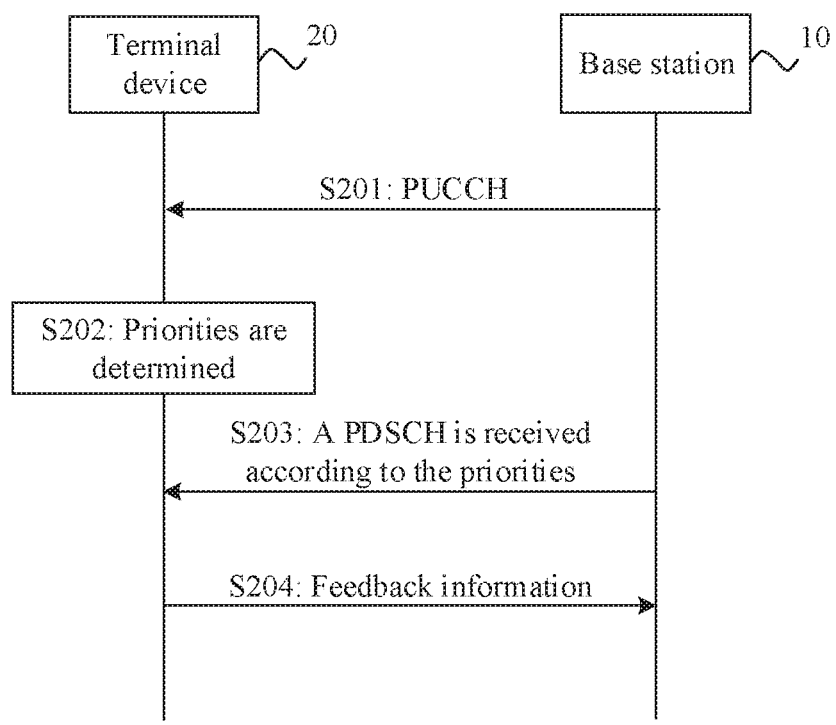
FIG. 2 is a schematic flowchart of a data transmission method according to an embodiment of the disclosure.

Shortening a TTI is a key technology for reducing a transmission delay. At present, LTE-A Rel-13 has started researching use of a shorter TTI for data transmission but requires compatibility with an existing LTE system, i.e., compatibility with a 1 ms TTI, to be ensured on a carrier supporting short-TTI transmission. To ensure a transmission delay and simultaneously take the system efficiency into account, in this case, a terminal may be dynamically scheduled to use different TTI lengths, that is, a short TTI is used when a short-delay service is transmitted, and a conventional TTI is used when other services are transmitted. However, there is yet no definite solution for dynamically scheduling the terminal to use different TTIs for data transmission at present. The embodiments of the disclosure provide a method for dynamically supporting multiple TTIs for data transmission. FIG. 2 is a schematic flowchart of a data transmission method according to an embodiment of the disclosure. The method illustrated in FIG. 2 includes the following operations.

In S201, a base station 10 sends a Physical Downlink Control Channel (PDCCH) to a terminal device 20.

Specifically, the base station 10 may send the PDCCH by using a manner defined in an existing protocol. The PDCCH may include a first DCI, and the first DCI is configured to schedule the terminal device 20 to receive a first PDSCH transmitted by using a first TTI on a target carrier.

That is, the first DCI relates to scheduling for the first PDSCH to be transmitted. The first PDSCH to be transmitted will be transmitted on the target carrier, and the first PDSCH to be transmitted will be transmitted by using the first TTI.

Optionally, the PDCCH may further include second DCI, and the second DCI is configured to schedule the terminal device 20 to receive a second PDSCH transmitted by using a second TTI on the target carrier.

Figure 3:
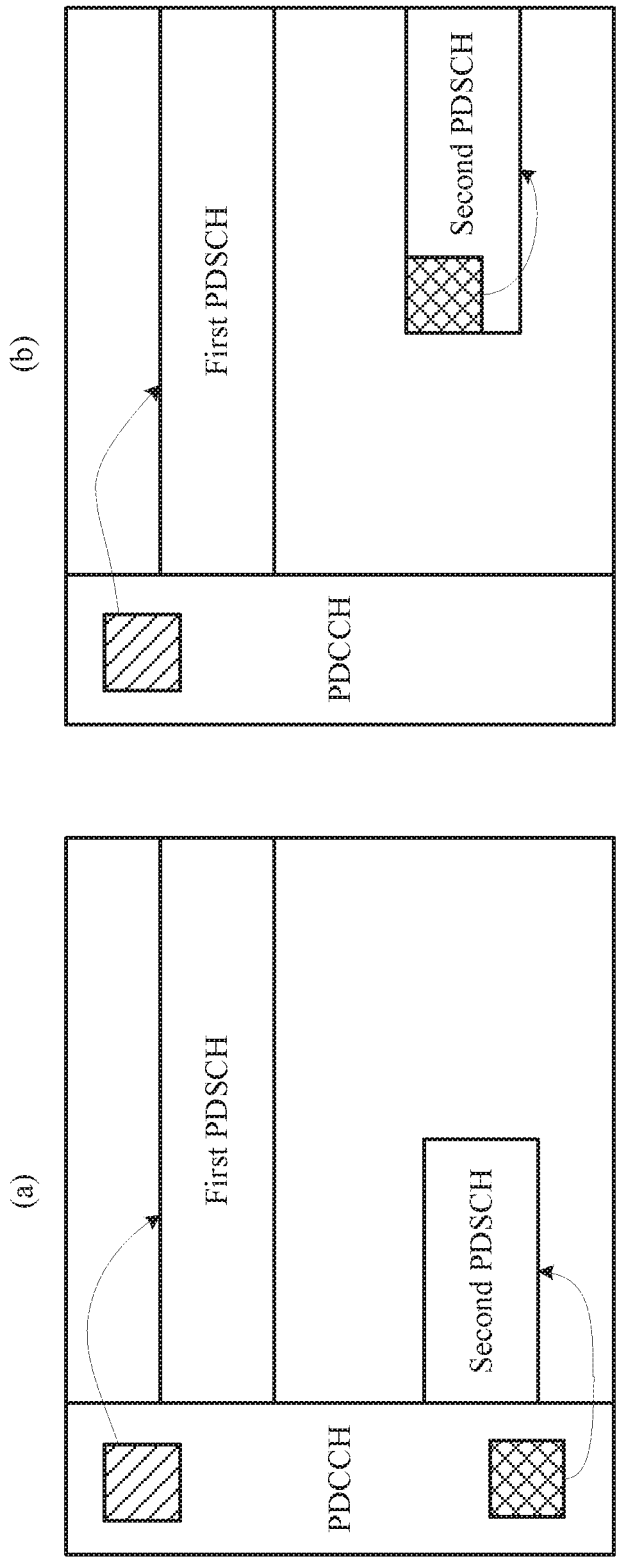
FIG. 3(a) and FIG. 3(b) are schematic diagrams of a relationship between a first PDSCH and a second PDSCH according to an embodiment of the disclosure.

In the embodiment of the disclosure, time resources of the first PDSCH and the second PDSCH may partially overlap, as illustrated in FIG. 3(a) and FIG. 3(b). In FIG. 3, a horizontal direction represents time resources. In addition, in FIG. 3(a), the PUCCH includes the first DCI and the second DCI. In FIG. 3(b), the PUCCH includes the first DCI but does not include the second DCI.

It should be noted that the first TTI is unequal to the second TTI. For example, the first TTI may be smaller than the second TTI, or, the second TTI may be smaller than the first TTI. As an example, the subsequent embodiments of the disclosure will be described with the condition that the first TTI is smaller than the second TTI.

It can be understood that, in S201, the terminal device 20 receives the first DCI and the second DCI sent by the base station 10. Specifically, the terminal device 20 may receive the first DCI and the second DCI at the same time, or, the terminal device 20 may receive the first DCI at first and then receive the second DCI, or, the terminal device 20 may receive the second DCI at first and then receive the first DCI, which will not be limited in the disclosure.

In S202, the terminal device 20 determines a priority relationship between the first DCI and the second DCI.

The terminal device 20 may determine that a priority of the first DCI is higher than or lower than a priority of the second DCI, that is, the first DCI and the second DCI have different priorities. The terminal device 20 may also determine that the priority of the first DCI is equal to the priority of the second DCI, that is, the first DCI and the second DCI have the same priority.

Specifically, in S202, the terminal device 20 may determine the priority relationship between the first DCI and the second DCI according to priorities of RNTIs of the first DCI and the second DCI.

Optionally, in the embodiment of the disclosure, the priority of the RNTI may include a first RNTI priority and a second RNTI priority, wherein the first RNTI priority may include any one of: an SI-RNTI, a P-RNTI, an RA-RNTI and a temporary RNTI, and the second RNLI priority may include any one of: a C-RNTI and an SPS-RNTI.

It can be understood that, in the embodiment of the disclosure, the classification for the priority of the RNTI may further be refined and for example, includes a first RNTI priority, a second RNTI priority and a third RNTI priority, which will not be limited in the disclosure.

Specifically, in S202, the terminal device 20 may acquire the RNTI of the first DCI and the RNTI of the second DVI, and determine the priority of the RNTI of the first DCI and the priority of the RNTI of the second DCI.

In such a manner, the terminal device 20 may determine the priority of the first DCI and the priority of the second DCI according to the priority of the RNTI of the first DCI and the priority of the RNTI of the second DCI. Specifically, when the priority of the RNTI of the first DCI belongs to the first RNTI priority, the priority of the first DCI is determined to be a first priority. When the priority of the RNTI of the first DCI belongs to the second RNTI priority, the priority of the first DCI is determined to be a second priority. When the priority of the RNTI of the second DCI belongs to the first RNTI priority, the priority of the second DCI is determined to be the first priority. When the priority of the RNTI of the second DCI belongs to the second RNTI priority, the priority of the second DCI is determined to be the second priority.

In S203, the terminal device 20 receives the first PDSCH or the second PDSCH according to the priority relationship.

Specifically, when the priority of the first DCI is higher than the priority of the second DCI, the terminal device 20 receives the first PDSCH on the target carrier. When the priority of the first DCI is lower than the priority of the second DCI, the terminal device 20 receives the second PDSCH on the target carrier.

When the first DCI and the second DCI have the same priority, the terminal device 20 receives the PDSCH corresponding to the smaller TTI. For example, when the first DCI and the second DCI have the same priority and the first TTI is smaller than the second TTI, the terminal device 20 receives the first PDSCH on the target carrier. When the first DCI and the second DCI have the same priority and the first TTI is larger than the second TTI, the terminal device 20 receives the second PDSCH on the target carrier.

Figure 4:
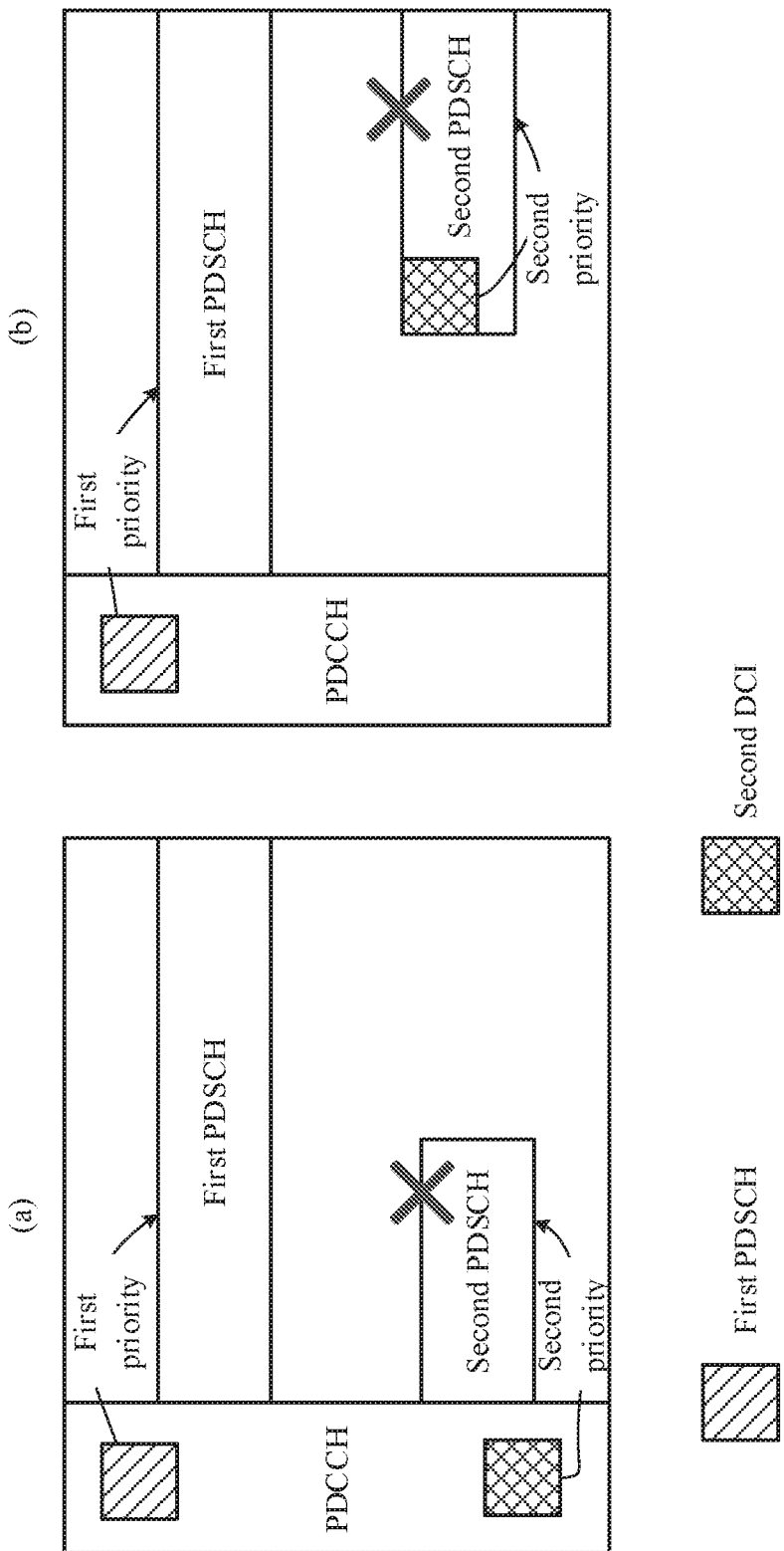
FIG. 4(a) and FIG. 4(b) are schematic diagrams of receiving a first PDSCH according to an embodiment of the disclosure.

That is, when the priority of the first DCI is the first priority and the priority of the second DCI is the second priority, the first PDSCH is received on the target carrier. As illustrated in FIG. 4(a) and FIG. 4(b), "X" in FIG. 4 represents that the second PDSCH is not received. When the priority of the first DCI is the second priority and the priority of the second DCI is the first priority, the second PDSCH is received on the target carrier.

When the priority of the first DCI is the first priority and the priority of the second DCI is the first priority, or when the priority of the first DCI is the second priority and the priority of the second DCI is the second priority, and the first TTI is smaller than the second TTI, the first PDSCH is received on the target carrier.

Figure 5:
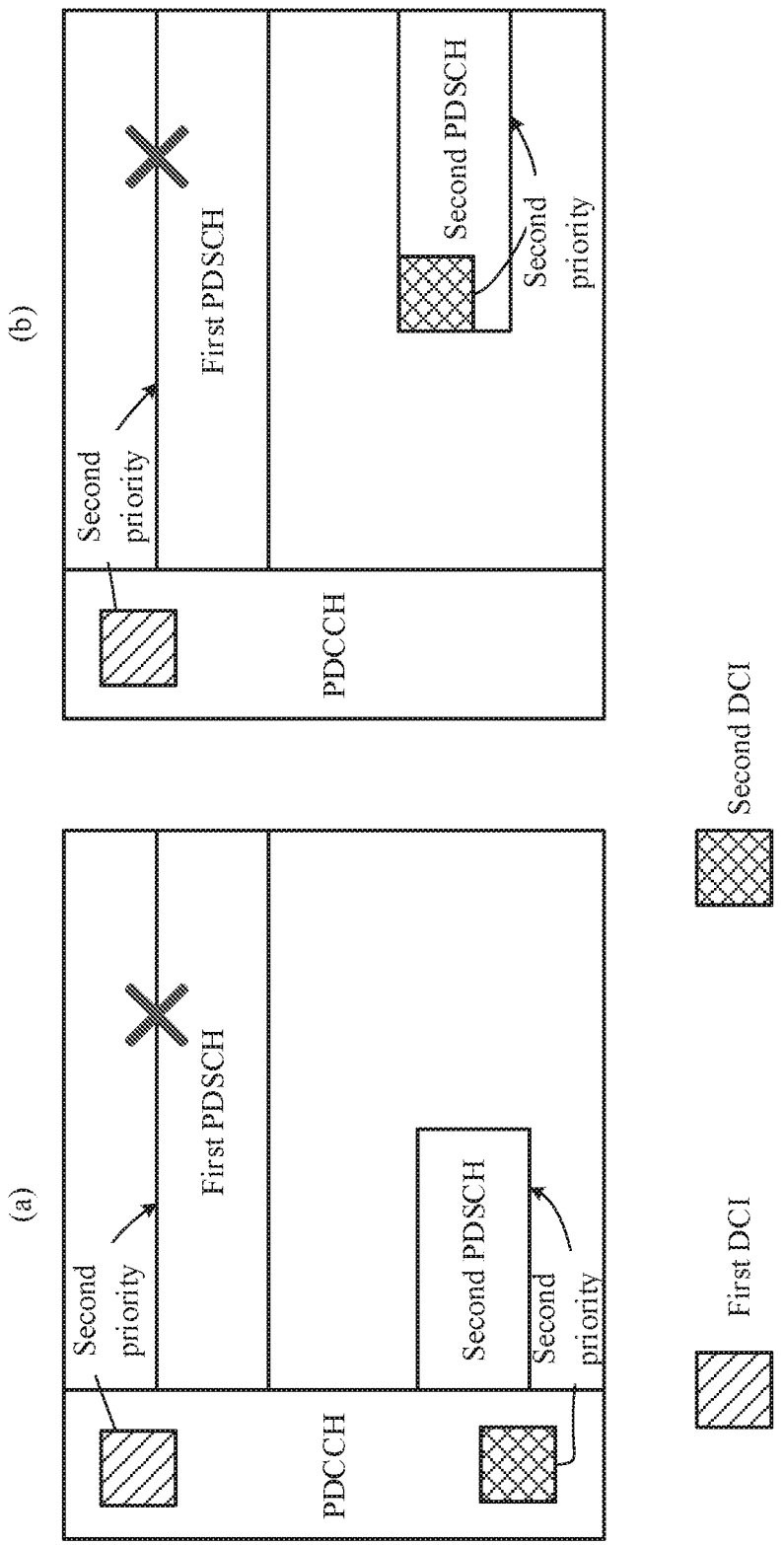
FIG. 5(a) and FIG. 5(b) are schematic diagrams of receiving a second PDSCH according to an embodiment of the disclosure.

When the priority of the first DCI is the first priority and the priority of the second DCI is the first priority, or when the priority of the first DCI is the second priority and the priority of the second DCI is the second priority, and the first TTI is larger than the second TTI, the second PDSCH is received on the target carrier. As illustrated in FIG. 5(a) and FIG. 5(b), the first DCI and the second both have the second priority and the first TTI is larger than the second TTI, "X" in FIG. 5 represents that the first PDSCH is not received.

It can be understood that, in S203, the operation that the terminal device 20 receives the first PDSCH may also be understood as an operation that the terminal device 20 demodulates the first PDSCH, and similarly, the operation that the terminal device 20 receives the second PDSCH may also be understood as an operation that the terminal device 20 demodulates the second PDSCH.

As another example, for a scenario such as illustrated in FIG. 3(b), the terminal device 20 may receive the first DCI in the PDCCH at first. Further, once the terminal device 20 does not detect any other DCI when receiving the first DCI, the terminal device may start demodulating the first PDSCH after receiving the first DCI. When the terminal device 20 receives the second DCI during the process of demodulating the first PDSCH, the terminal device 20 may execute the operation in S202 again, and when the terminal device 20 determines that the priority of the first DCI is higher than the priority of the second DCI (for example, the priority of the first DCI is the first priority and the priority of the second DCI is the second priority; or, the first DCI and the second DCI have the same priority but the first TTI is smaller than the second TTI), the terminal device 20 may continue demodulating the first PDSCH. When the terminal device 20 determines that the priority of the first DCI is lower than the priority of the second (for example, the priority of the first DCI is the second priority and the priority of the second DCI is the first priority; or, the first DCI and the second DCI have the same priority but the first TTI is larger than the second TTI), the terminal device 20 may stop demodulating the first PDSCH and start demodulating the second PDSCH.

Further, after S203, the method may further include the following operation.

In S204, the terminal device 20 sends feedback information to the base station 10.

Specifically, the terminal device 20 may further feed back ACK or NACK information to the base station in an uplink subframe. Specifically, the terminal device 20 may include an ACK/NACK in a Physical Uplink Control Channel (PUCCH) or a Physical Uplink Shared Channel (PUSCH).

For example, when the terminal device 20 receives the second PDSCH in S203, after S203, the terminal device 20 may feed back an ACK or NACK message for the second PDSCH to the base station according to the determination regarding whether the second PDSCH is successfully received or not. Meanwhile, the terminal device 20 may feed back a NACK message for the first PDSCH to the base station, or, the terminal device 20 does not feed back any message for the first PDSCH to the base station. That is, a feedback sent to the base station 10 by the terminal device 20 may only include an ACK/NACK for the second PDSCH. Alternatively, the feedback sent to the base station 10 by the terminal device 20 may include the ACK/NACK for the second PDSCH, and also include a NACK for the first PDSCH.

For example, when the terminal device 20 receives the first PDSCH in S203, after S203, the terminal device 20 may feed back an ACK or NACK message for the first PDSCH to the base station according to the determination regarding whether the first PDSCH is successfully received or not. Meanwhile, the terminal device 20 may feed back a NACK message for the second PDSCH to the base station, or, the terminal device 20 does not feed back any message for the second PDSCH to the base station. That is, a feedback sent to the base station 10 by the terminal device 20 may only include an ACK/NACK for the first PDSCH. Alternatively, the feedback sent to the base station 10 by the terminal device 20 may not only include the ACK/NACK for the first PDSCH but also include a NACK for the second PDSCH.

FIG. 6 is a schematic diagram of a feedback message of the terminal device 20 in the uplink subframe for a condition illustrated in FIG. 4(a). In FIG. 6, it is illustrated on upper right that the terminal device 20 feeds back the ACK or NACK message for the first PDSCH to the base station, but does not feed back any message for the second PDSCH to the base station. In FIG. 6, it is illustrated on bottom right that the terminal device 20 feeds back the ACK or NAM message for the first PDSCH to the base station 10, and simultaneously feeds back the NACK message for the second PDSCH to the base station 10.

For the base station 10 the base station 10 may determine the priority relationship between the first DCI and the second DCI according to the priorities of the RNTIs of the sent first DCI and second DCI, and determine whether the received PDSCH by the terminal device 20 is the first PDSCH or the second PDSCH according to the priority relationship. That is, the base station 10 may determine a specific PDSCH received by the terminal device 20 according to the priority relationship between the sent first DCI and second DCI, so that the base station 10 may determine the specific PDSCH for which the received feedback information is directed. Wherein, a method by which the base station 10 determines the priority relationship between the first DCI and the second DCI is similar to the method by which the terminal device 20 determines the priority relationship and will not be elaborated herein.

It can be understood that the priorities of the RNTIs of the DCI may be predetermined according to a standard and the priorities of the RNTIs may be pre-stored in the terminal device and a network device.

It can be seen that, according to the method provided by the embodiment of the disclosure, data transmission with multiple TTIs may be dynamically supported in the same carrier, and the terminal device may determine a priority of a transmission channel in a subframe. The method may not only meet a delay requirement but also achieve the compatibility with an existing system.

FIG. 7 is another schematic flowchart of a data transmission method according to an embodiment of the disclosure. The method illustrated in FIG. 7 is executed by a terminal device, and the method includes the following operations.

In S701, the terminal device receives first DCI and second DCI, wherein the first DCI is configured for scheduling the terminal device to receive a first PDSCH transmitted by using a first TTI on a target carrier, the second DCI is configured for scheduling the terminal device to receive a second PDSCH transmitted by using a second TTI on the target carrier, the first TTI is smaller than the second TTI, and time resources of the first PDSCH and the second PDSCH at least partially overlap.

In S702, the terminal device determines a priority relationship between the first DCI and the second DCI.

In S703, the terminal device receives the first PDSCH or the second PDSCH on the target carrier according to the priority relationship.

Wherein, the operation in S701 of FIG. 7 may refer to related descriptions about S201 in FIG. 2, the operation in S702 of FIG. 7 may refer to related descriptions about S202 in FIG. 2, and the operation in S703 of FIG. 7 may refer to related descriptions about S203 in FIG. 2. Elaborations will not be made herein to avoid repetitions.

Optionally, after S703, the method may further include that: the terminal device sends a feedback. The feedback may include an ACK/NACK for the received PDSCH. Or, the feedback may not only include the ACK/NACK for the received PDSCH but also include a NACK for the unreceived PDSCH. Wherein, when the received PDSCH is the first PDSCH, the unreceived PDSCH is the second PDSCH; and when the received PDSCH is the second PDSCH, the unreceived PDSCH is the first PDSCH.

FIG. 8 is a structure block diagram of a terminal device according to an embodiment of the disclosure. The terminal device 80 illustrated in FIG. 8 includes: a receiving unit 801, a determination unit 802 and a sending unit 803.

The receiving unit 801 may be configured to receive first DCI and second DCI, wherein the first DCI is configured to schedule the terminal device to receive a first PDSCH transmitted by using a first TTI on a target carrier, the second DCI is configured to schedule the terminal device to receive a second PDSCH transmitted by using a second TTI on the target carrier, the first TTI is smaller than the second TTI, and time resources of the first PDSCH and the second PDSCH at least partially overlap.

The determination unit 802 may be configured to determine a priority relationship between the first DCI and second DCI received by the receiving unit 801.

The receiving unit 801 is further configured to receive the first PDSCH or the second PDSCH on the target carrier according to the priority relationship determined by the determination unit 801.

Wherein, the determination unit 802 may be specifically configured to determine the priority relationship between the first DCI and the second DCI according to priorities of RNTIs of the first DCI and the second DCI. The priority of the RNTI includes a first RNTI priority and a second RNTI priority, the first RNTI priority includes at least one of the following: an SI-RNTI, a P-RNTI, an RA-RNTI or a temporary RNTI, and the second RNTI priority includes at least one of a C-RNTI or an SPS-RNTI.

Optionally, the determination unit 802 is specifically configured to: when the priority of the RNTI of the first DCI belongs to the first RNTI priority, determine the priority of the first DCI to be a first priority;

when the priority of the RNTI of the first DCI belongs to the second RNTI priority, determine the priority of the first DCI to be a second priority;

when the priority of the RNTI of the second DCI belongs to the first RNTI priority, determine the priority of the second DCI to be the first priority; and when the priority of the RNTI of the second DCI belongs to the second RNTI priority, determine the priority of the second DCI to be the second priority.

Correspondingly, the receiving unit 801 is specifically configured to: when the priority of the first DCI is the first priority and the priority of the second DCI is the second priority, receive the PDSCH on the target carrier; when the priority of the first DCI is the second priority and the priority of the second DCI is the first priority, receive the second PDSCH on the target carrier; and when the priority of the first DCI is the first priority and the priority of the second DCI is the first priority, or when the priority of the first DCI is the second priority and the priority of the second DCI is the second priority, receive the first PDSCH on the target carrier.

Optionally, the sending unit 803 may be configured to send a feedback. The feedback may only include an ACK/NACK for the received PDSCH. Or, the feedback may not only include the ACK/NACK for the received PDSCH but also include a NACK for the unreceived PDSCH. Wherein, when the received PDSCH is the first PDSCH, the unreceived PDSCH is the second PDSCH; and when the received PDSCH is the second PDSCH, the unreceived PDSCH is the first PDSCH.

Figure 9:
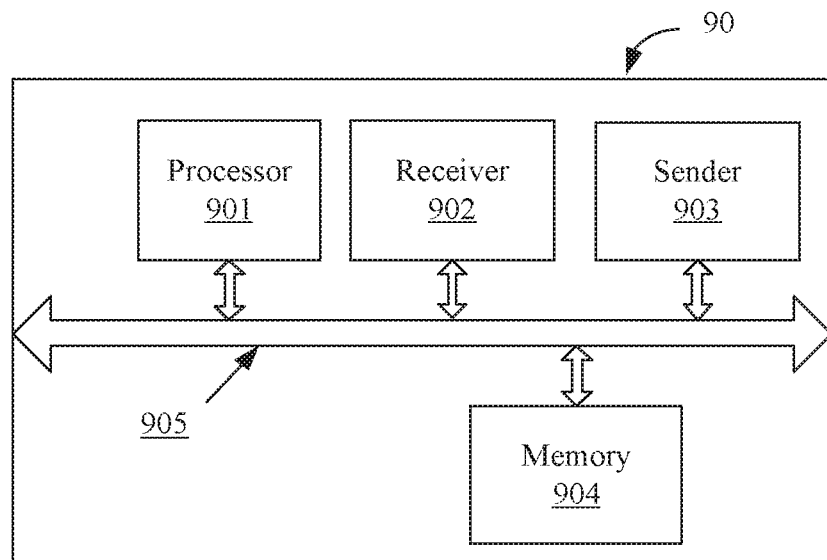
FIG. 9 is another structure block diagram of a terminal device according to an embodiment of the disclosure.

It should be noted that, in the embodiment of the disclosure, the receiving unit 801 may be implemented by a receiver, the determination unit 802 may be implemented by a processor and the sending unit 803 may be implemented by a sender. As illustrated in FIG. 9, a terminal device 90 may include a processor 901, a receiver 902, a sender 903 and a memory 904. The memory 904 may be configured to store priority information and the like, and may also be configured to store a code executed by the processor 901 and the like.

Components in the terminal device 90 are coupled together through a bus system 905, wherein the bus system 905 includes a data bus, and further includes a power bus, a control bus and a state signal bus.

Figure 10:
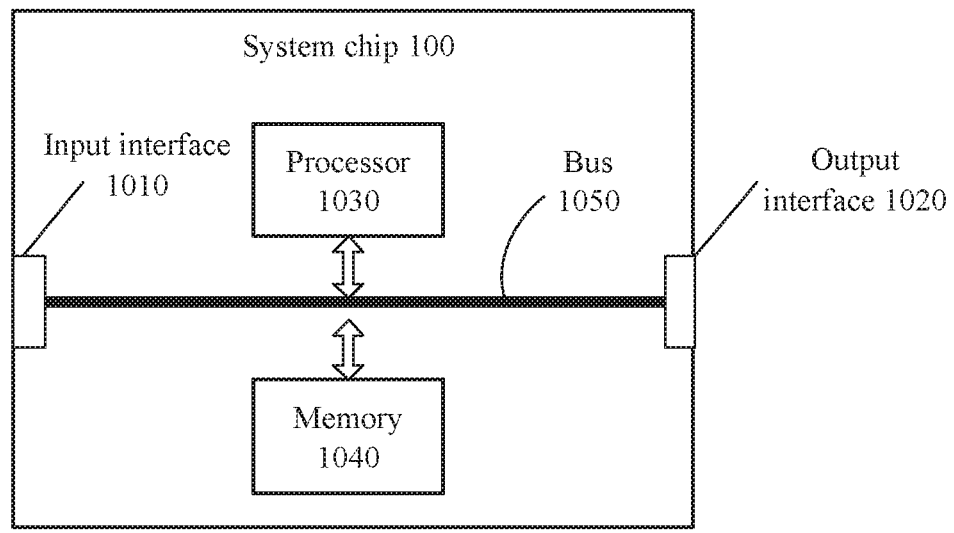
FIG. 10 is a schematic structure diagram of a system chip according to an embodiment of the disclosure.

FIG. 10 is a schematic structure diagram of a system chip according to an embodiment of the disclosure. The system chip 100 of FIG. 10 includes an input interface 1010, an output interface 1020, at least one processor 1030 and a memory 1040. The input interface 1010, the output interface 1020, the processor 1030 and the memory 1040 are connected through a bus 1050. The processor 1030 is configured to execute a code in the memory 1040, and when the code is executed, the processor 1030 implements the methods executed by a terminal device in FIG. 2 to FIG. 7.

The terminal device 80 illustrated in FIG. 8 or the terminal device 90 illustrated in FIG. 9 or the system chip 100 illustrated in FIG. 10 may implement each process implemented by a terminal device in the method embodiments of FIG. 2 to FIG. 7, which will not be elaborated herein to avoid repetitions.

FIG. 11 is another schematic flowchart of a data transmission method according to an embodiment of the disclosure. The method of FIG. 11 includes the following operations.

In S1101, a network device sends a first DCI and a second DCI, wherein the first DCI is configured for scheduling a terminal device to receive a first PDSCH transmitted by using a first TTI on a target carrier, the second DCI is configured for scheduling the terminal device to receive a second PDSCH transmitted by using a second TTI on the target carrier, the first TTI is smaller than the second TTI, and time resources of the first PDSCH and the second PDSCH at least partially overlap.

In S1102, the network device receives feedback information from the terminal device.

Wherein, the operation in S1101 of FIG. 11 may refer to descriptions about S201 in the method embodiment of FIG. 2 and the operation in S1102 of FIG. 11 may refer to descriptions about S204 in the method embodiment of FIG. 2. Elaborations will not be made herein to avoid repetitions.

The feedback information may include ACK/NACK information corresponding to the received PDSCH by the terminal device; or, the feedback information includes: the ACK/NACK information corresponding to the received PDSCH by the terminal device and NACK information corresponding to the unreceived PDSCH by the terminal device. When the received PDSCH is the first PDSCH the unreceived PDSCH is the second PDSCH, and when the received PDSCH is the second PDSCH, the unreceived PDSCH is the first PDSCH.

Optionally, the method illustrated in FIG. 11 may further include that: the network device determines a priority relationship between the first DCI and the second DCI according to priorities of RNTIs of the first DCI and the second DCI, and the network device determines whether the received PDSCH is the first PDSCH or the second PDSCH according to the priority relationship.

Wherein, when a priority of the first DCI is a first priority and a priority of the second DCI is a second priority, the received PDSCH is the first PDSCH and the unreceived PDSCH is the second PDSCH. When the priority of the first DCI is the second priority and the priority of the second DCI is the first priority, the received PDSCH is the second PDSCH and the unreceived PDSCH is the first PDSCH. When the priority of the first DCI is the first priority and the priority of the second DCI is the first priority, or when the priority of the first DCI is the second priority and the priority of the second DCI is the second priority, since the first TTI is smaller than the second TTI, the received PDSCH is the first PDSCH and the unreceived PDSCH is the second PDSCH. That is, the network device may determine the specific PDSCH for which the received feedback information is directed according to the priority relationship between the first DCI and the second DCI.

Specifically, the network device may pre-store an RNTI of the first DCI and an RNTI of the second DCI, and may determine the priority relationship between the first DCI and the second DCI according to priorities of the RNTIs.

Wherein, the priority of the RNTI includes a first RNTI priority and a second RNTI priority. The first RNTI priority includes at least one of: an SI-RNTI, a P-RNTI, an RA-RNTI or a temporary RNTI. The second RNTI priority includes at least one of a C-RNTI or an SPS-RNTI.

In such a manner, the network device may learn about the specific TTI by which the PDSCH received by the terminal device is transmitted.

FIG. 12 is a structure block diagram of a network device according to an embodiment of the disclosure. The network device 120 illustrated in FIG. 12 includes a sending unit 1201 and a receiving unit 1202.

The sending unit 1201 may be configured to send a first DCI and a second DCI, wherein the first DCI is configured to schedule a terminal device to receive a first PDSCH transmitted by using a first TTI on a target carrier, the second DCI is configured to schedule the terminal device to receive a second PDSCH transmitted by using a second TTI on the target carrier, the first TTI is smaller than the second TTI, and time resources of the first PDSCH and the second PDSCH at least partially overlap. The receiving unit 1202 may be configured to receive feedback information from the terminal device.

Optionally, the network device 120 may further include a processing unit. The processing unit may be configured to determine a priority relationship between the first DCI and the second DCI according to priorities of RNTIs of the first DCI and the second DCI, and determine whether the received PDSCH is the first PDSCH or the second PDSCH according to the priority relationship.

Figure 13:
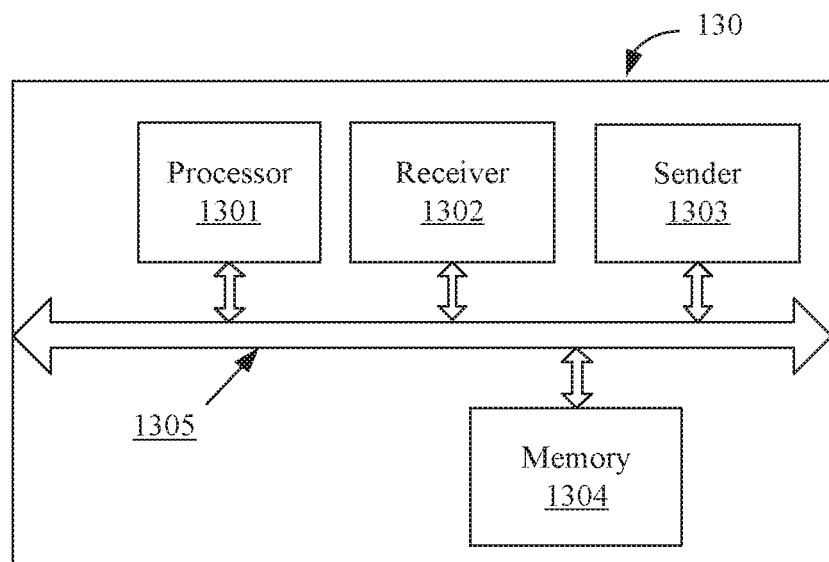
FIG. 13 is another structure block diagram of a network device according to an embodiment of the disclosure.

It should be noted that, in the embodiment of the disclosure, the receiving unit 1202 may be implemented by a receiver, the sending unit 1201 may be implemented by a sender and the processing unit may be implemented by a processor. As illustrated in FIG. 13, a network device 130 may include a processor 1301, a receiver 1302, a sender 1303 and a memory 1304, wherein the memory 1304 may be configured to store a code executed by the processor 1301 and the like. The processor 1301 may be configured to execute the code stored in the memory 1304, and for example, may be configured to generate the first DCI and second DCI and may further be configured to execute subsequent operations and the like according to feedback information.

Components in the network device 130 are coupled together through a bus system 1305, wherein the bus system 1305 includes a data bus, and further includes a power bus, a control bus and a state signal bus.

Figure 14:
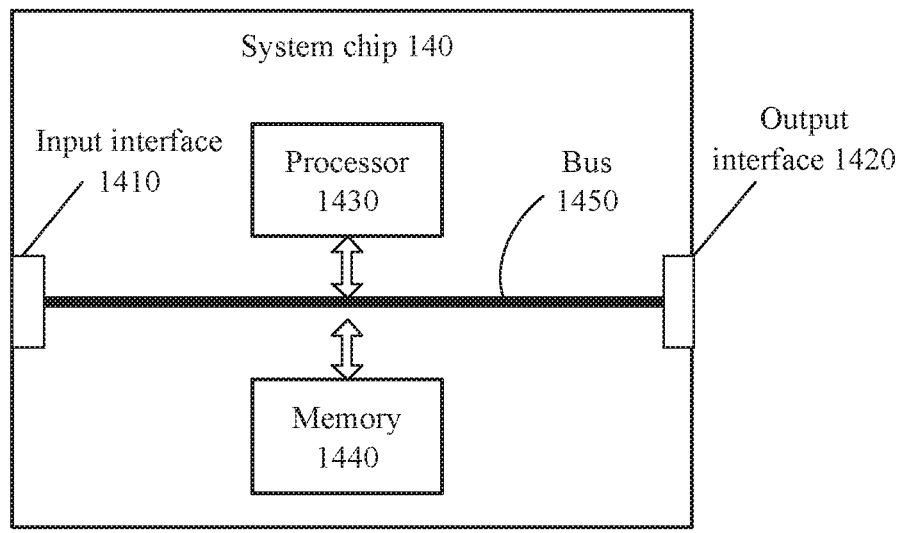
FIG. 14 is another schematic structure diagram of a system chip according to an embodiment of the disclosure.

FIG. 14 is another schematic structure diagram of a system chip according to an embodiment of the disclosure. The system chip 140 of FIG. 14 includes an input interface 1410, an output interface 1420, at least one processor 1430 and a memory 1440. The input interface 1410, the output interface 1420, the processor 1430 and the memory 1440 are connected through a bus 1450. The processor 1430 may be configured to execute a code in the memory 1440, and when the code is executed, the processor 1430 implements the methods executed by a base station or a network device in FIG. 2 to FIG. 7 and FIG. 11.

The network device 120 illustrated in FIG. 12 or the network device 130 illustrated in FIG. 13 or the system chip 100 illustrated in FIG. 10 may implement each process implemented by a base station or a network device in the method embodiments of FIG. 2 to FIG. 7 and FIG. 11, which will not be elaborated herein to avoid repetitions.

It can be understood that the processor may be an integrated circuit chip with a signal processing capability. In an implementation process, each operation of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the disclosure may be implemented or executed. The universal processor may be a microprocessor or the processor may also be any conventional processor and the like. The steps of the methods disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the steps of the methods in combination with hardware.

It can be understood that the memory in the embodiment of the disclosure may be a volatile memory or a nonvolatile memory, or may include both the volatile and nonvolatile memories, wherein the nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ES-DRAM), a Synchlink DRAM (SLDRAM) and a Direct Rambus RAM (DR RAM). It should be noted that the memory of a system and method described in the disclosure is intended to include, but not limited to, memories of these and any other proper types.

Those of ordinary skilled in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by using different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the application, it should be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit.

When being realized in form of software function unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a piece of computer equipment (which may be a personal computer, a server, network equipment or the like) to execute all or part of the steps of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A data transmission method, comprising:
receiving, by a terminal device, first Downlink Control Information (DCI) and second DCI, wherein the first DCI is configured for scheduling the terminal device to receive a first Physical Downlink Shared Channel (PDSCH) transmitted by using a first Transmission Time Interval (TTI) on a target carrier, the second DCI is configured for scheduling the terminal device to receive a second PDSCH transmitted by using a second TTI on the target carrier, the first TTI is smaller than the second TTI, and time resources of the first PDSCH and the second PDSCH at least partially overlap;
determining, by the terminal device, a priority relationship between the first DCI and the second DCI; and
when a priority of the first DCI is a first priority and a priority of the second DCI is the first priority, or when the priority of the first DCI is a second priority and the priority of the second DCI is the second priority, receiving, by the terminal device, the first PDSCH on the target carrier.

2. The method according to claim 1, wherein determining the priority relationship between the first DCI and the second DCI comprises:
determining the priority relationship between the first DCI and the second DCI according to priorities of Radio Network Temporary Identifiers (RNTIs) of the first DCI and the second DCI.

3. The method according to claim 2, wherein the priorities of the RNTIs comprise a first RNTI priority and a second RNTI priority,
wherein the first RNTI priority comprises at least one of the following: a System Information RNTI (SI-RNTI), a Paging RNTI (P-RNTI), a Random Access RNTI (RA-RNTI) or a temporary RNTI; and
the second RNTI priority comprises at least one of the following: a Cell RNTI (C-RNTI) or a Semi-Persistent Scheduling RNTI (SPS-RNTI).

4. The method according to claim 1, further comprising:
when a priority of the first DCI is a first priority and a priority of the second DCI is a second priority, receiving, by the terminal device, the first PDSCH on the target carrier.

5. The method according to claim 1, further comprising:
sending, by the terminal device, Acknowledgement (ACK)/Negative Acknowledgement (NACK) information corresponding to a received PDSCH; or,
sending, by the terminal device, ACK/NACK information corresponding to a received PDSCH and sending NACK information corresponding to an unreceived PDSCH,
wherein, when the received PDSCH is the first PDSCH, the unreceived PDSCH is the second PDSCH, and when the received PDSCH is the second PDSCH, the unreceived PDSCH is the first PDSCH.

6. The method according to claim 1, further comprising:
when a priority of the first DCI is a second priority and a priority of the second DCI is a first priority, receiving the second PDSCH on the target carrier.

7. A terminal device, comprising: a memory, a processor, and a computer program stored on the memory and capable of running on the processor, wherein the computer program, when executed by the processor, cause the processor to execute operations comprising:
receiving first Downlink Control Information (DCI) and second DCI, wherein the first DCI is configured for scheduling the terminal device to receive a first Physical Downlink Shared Channel (PDSCH) transmitted by using a first Transmission Time Interval (TTI) on a target carrier, the second DCI is configured for scheduling the terminal device to receive a second PDSCH transmitted by using a second TTI on the target carrier, the first TTI is smaller than the second TTI, and time resources of the first PDSCH and the second PDSCH at least partially overlap;
determining a priority relationship between the first DCI and the second DCI; and
when a priority of the first DCI is a first priority and a priority of the second DCI is the first priority, or when the priority of the first DCI is a second priority and the priority of the second DCI is the second priority, receiving the first PDSCH on the target carrier.

8. The terminal device according to claim 7, wherein the processor is specifically configured to:
determine the priority relationship between the first DCI and the second DCI according to priorities of Radio Network Temporary Identifiers (RNTIs) of the first DCI and the second DCI.

9. The terminal device according to claim 8, wherein the priorities of the RNTIs comprise a first RNTI priority and a second RNTI priority,
wherein the first RNTI priority comprises at least one of the following: a System Information RNTI (SI-RNTI), a Paging RNTI (P-RNTI), a Random Access RNTI (RA-RNTI) or a temporary RNTI; and
the second RNTI priority comprises at least one of the following: a Cell RNTI (C-RNTI) or a Semi-Persistent Scheduling RNTI (SPS-RNTI).

10. The terminal device according to claim 7, wherein the processor is specifically configured to: when a priority of the first DCI is a first priority and a priority of the second DCI is a second priority, receive the first PDSCH on the target carrier.

11. The terminal device according to claim 7, wherein the processor is further configured to:

send Acknowledgement (ACK)/Negative Acknowledgement (NACK) information corresponding to a received PDSCH; or, send ACK/NACK information corresponding to a received PDSCH and send NACK information corresponding to an unreceived PDSCH, wherein, when the received PDSCH is the first PDSCH, the unreceived PDSCH is the second PDSCH, and when the received PDSCH is the second PDSCH, the unreceived PDSCH is the first PDSCH.

12. The terminal device according to claim 7, wherein the processor is specifically configured to:

when a priority of the first DCI is a second priority and a priority of the second DCI is a first priority, receive the second PDSCH on the target carrier.

* * * * *